(12) United States Patent  
Hendrickson et al.

(10) Patent No.: US 9,232,693 B2
(45) Date of Patent: Jan. 12, 2016

(54) SYSTEM AND METHOD FOR SENSING AND MAPPING STALK DIAMETER

(71) Applicant: DEERE & COMPANY, Moline, IL (US)

(72) Inventors: Larry L. Hendrickson, Savoy, IL (US); Niels Dybro, Sherrard, IL (US); Noel W. Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 83 days.

(21) Appl. No.: 14/272,910

(22) Filed: May 8, 2014

(65) Prior Publication Data

US 2015/0319929 A1   Nov. 12, 2015

(51) Int. Cl.
*G01B 5/08* (2006.01)
*A01D 75/00* (2006.01)
*A01D 45/02* (2006.01)
*G01B 3/38* (2006.01)

(52) U.S. Cl.
CPC .............. *A01D 75/00* (2013.01); *A01D 45/025* (2013.01); *G01B 3/38* (2013.01); *G01B 5/08* (2013.01)

(58) Field of Classification Search
CPC ....... A01D 75/00; A01D 45/025; G01B 3/38; G01B 5/08
USPC ...................................... 33/504, 555.1, 555.3
See application file for complete search history.

(56) References Cited

U.S. PATENT DOCUMENTS

| | | | |
|---|---|---|---|
| 3,126,690 A | 3/1964 | Keller et al. | |
| 4,958,442 A * | 9/1990 | Eckhardt ................. | G01B 5/08 33/550 |
| 5,680,750 A | 10/1997 | Stefl | |
| 5,685,085 A * | 11/1997 | Bond ....................... | G01B 3/42 33/520 |
| 6,073,427 A | 6/2000 | Nichols | |
| 7,062,896 B2 | 6/2006 | Resing et al. | |
| 7,228,640 B2 * | 6/2007 | Trionfetti ................ | B24B 49/04 33/552 |
| 8,196,380 B2 | 6/2012 | Carboni | |
| 8,220,235 B2 | 7/2012 | Kowalchuk | |
| 8,224,534 B2 | 7/2012 | Kowalchuk | |
| 2002/0178599 A1 * | 12/2002 | Smola ....................... | G01B 5/08 33/555.1 |
| 2003/0088991 A1 * | 5/2003 | Fullerton .................. | G01B 5/08 33/555.1 |
| 2012/0042619 A1 | 2/2012 | Lohrentz et al. | |
| 2012/0204528 A1 | 8/2012 | Regier | |
| 2013/0252513 A1 * | 9/2013 | Trionfetti .............. | B24B 49/045 33/555.1 |
| 2014/0230391 A1 * | 8/2014 | Hendrickson ...... | G01N 33/0098 56/10.2 R |
| 2015/0033570 A1 * | 2/2015 | Bernabe ................... | G01B 3/34 33/555.1 |
| 2015/0163992 A1 * | 6/2015 | Anderson .............. | A01B 41/06 701/50 |

FOREIGN PATENT DOCUMENTS

| | | |
|---|---|---|
| DE | 19725547 A1 | 6/2001 |
| DE | 10012088 A1 | 9/2001 |
| DE | 10327176 A1 | 1/2005 |
| EP | 2412228 B1 | 12/2013 |
| IT | 1291063 B1 | 12/1998 |

OTHER PUBLICATIONS

Luck et al., "Sensor Ranging Technique for Determining Corn Plant Population", ASABE Meeting Presentation Paper No. 084573, Jun. 29-Jul. 2, 2008.
Hummel et al, "Sensing Corn Population Another Variable in the Yield Equation", Proceedings of the 2001 InfoAg Conference, Indianapolis, IN., USA.

* cited by examiner

*Primary Examiner* — G. Bradley Bennett

(57) ABSTRACT

A system for sensing the diameter of stalks of plants senses the position of a laterally movable member arranged to contact a stalk of a plant located within an elongate gap in a row harvesting unit to determine and map the stalk diameters.

30 Claims, 6 Drawing Sheets

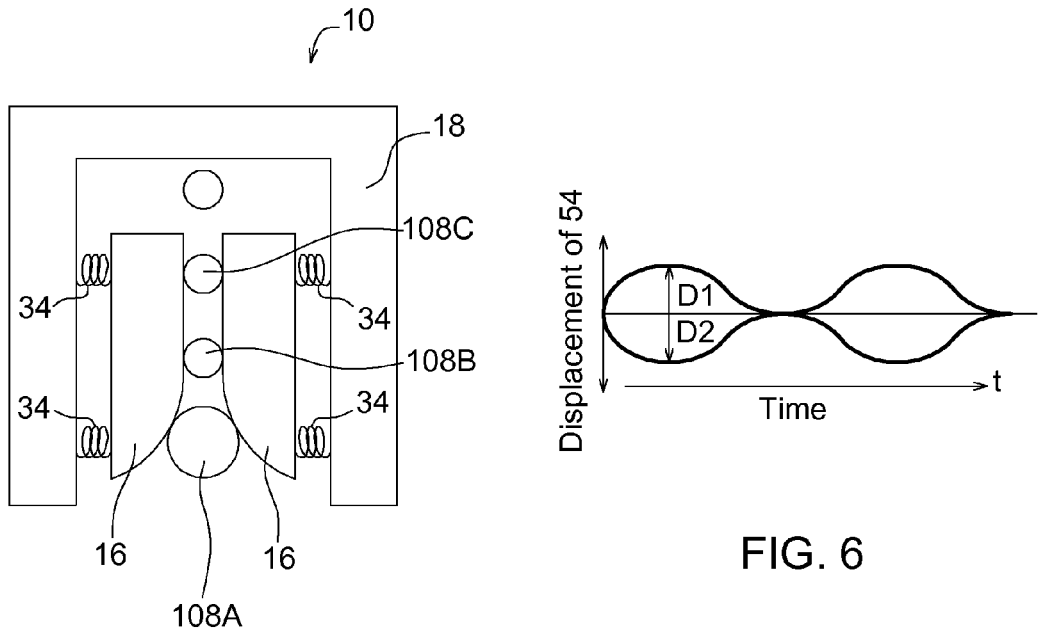
FIG. 5
FIG. 6
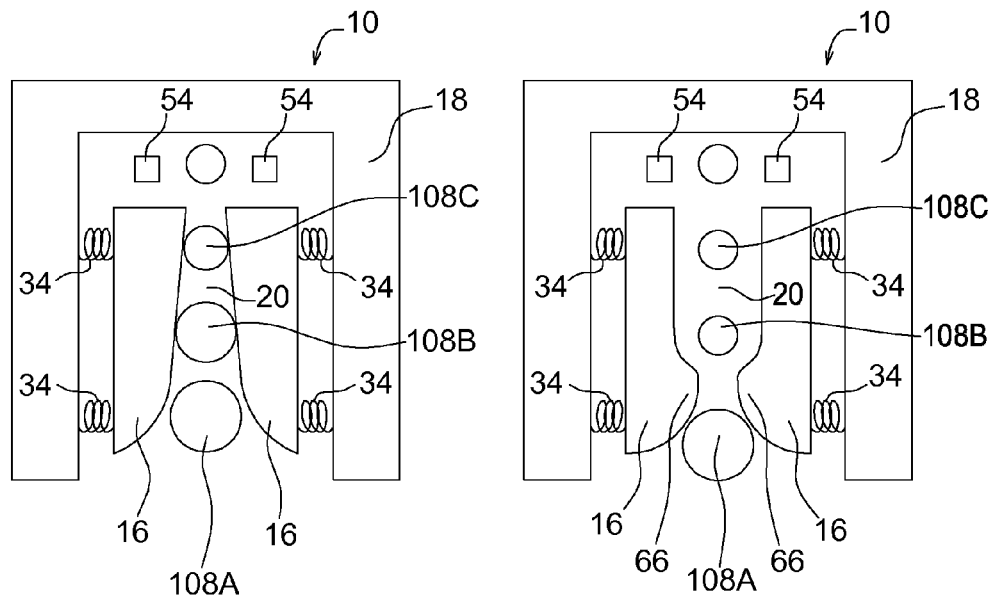
FIG. 7
FIG. 8

SYSTEM AND METHOD FOR SENSING AND MAPPING STALK DIAMETER

TECHNICAL FIELD

The present application relates generally to row harvesting units. More particularly, it relates to a system and method for sensing the diameter of stalks of plants being processed in a row unit.

BACKGROUND

A number of different arrangements for determining the throughput of agricultural harvesting machines have been proposed in the past, like sensing the torque for driving the feederhouse or cross auger of a platform or corn head. The sensed value can be used for controlling the propelling speed of the harvesting machine or recorded and geo-referenced in a map for agronomic purposes, like determining fertilizer amounts. These arrangements provide information about the mass or volume of plants per land area unit.

Corn plants are harvested with corn heads mounted at the front of agricultural harvesting machines, like combines or forage harvesters. During operation, stalk rolls pull down adjacent rows of corn plants and the ears of corn of the plants are snapped by stripper plates. The corn heads comprise a number of row harvesting units arranged side by side, each of the row harvesting units has a pair of stalk rolls, or one stalk roll interacting with a rigid wall, for pulling the plants down. The stripper plates are mounted above the stalk rolls, forming a forwardly extending elongate gap, through which the plant is pulled down by the stalk rolls. The distance between the stripper plates is generally manually adjustable and selected such that the stalk can pass, while the ears are removed from the stalks by the stripper plates and fed by a conveyor, usually a chain conveyor, to a cross auger feeding the ears to the interior of the harvesting machine.

SUMMARY

Various aspects of examples of the invention are set out in the claims.

According to a first aspect, a system for sensing a diameter of stalks of plants is disclosed. The system comprises a row harvesting unit with a frame defining an elongate gap along which stalks of plants move during a harvesting operation; a first sensor coupled to a laterally movable member arranged to contact a stalk of a plant located within the elongate gap and adapted to generate a signal representative of the position of the laterally movable member; and a processing unit adapted to derive a stalk diameter value representative of a diameter of the stalk from the signal of the first sensor and to store the stalk diameter value in a memory.

The row harvesting unit can comprise at least one stalk roll supported on the frame to be rotatable around its axis and arranged to pull down a plant stalk, a first stripper plate and a second stripper plate, the stripper plates supported on the frame and forming a elongate gap between the stripper plates above the stalk roll, the elongate gap having a longitudinal extension essentially parallel to the axis of the stalk roll. In this embodiment, the elongate gap is thus a stripper gap and the header is a corn head. However, in another embodiment the elongate gap can define a channel along which plant stalks are just transported, but not processed in any manner.

The first stripper plate may be supported to be movable in a direction extending transversely to the longitudinal extension of the elongate gap against a biasing force biasing the first stripper plate towards the second stripper plate and the first sensor is coupled to the first stripper plate and adapted to generate a signal representative of the position of the first stripper plate. In another embodiment, the first sensor may be coupled to the second stripper plate and adapted to generate a signal representative of the position of the second stripper plate.

The second stripper plate can be supported to be movable in a direction extending transversely to the longitudinal extension of the elongate gap against a biasing force biasing the second stripper plate towards the first stripper plate, a second sensor is coupled to the second stripper plate and adapted to generate a signal representative of the position of the second stripper plate, and the processing unit is adapted to derive the stalk diameter values representative of the stalk diameter of plants located within the elongate gap from signals of the first sensor and of the second sensor.

The processing unit can be adapted to assign a local maximum of added signals from the first sensor and the second sensor to a stalk.

In another embodiment, a feeler element is laterally movably mounted at the inlet end of the elongate gap and the first sensor senses the position of the feeler element.

The processing unit can be connected to a position determination system and be adapted to store the respective position of the system together with the stalk diameter value.

BRIEF DESCRIPTION OF THE DRAWINGS

FIG. 5 is a schematic representation of stalks in a row unit.

FIG. 6 is a schematic representation of signals from the sensors over time due to stalks entering the row unit.

FIG. 7 is a schematic representation of a second embodiment of a row unit.

FIG. 8 is a schematic representation of a third embodiment of a row unit.

DETAILED DESCRIPTION OF THE DRAWINGS

In an embodiment of the invention, the position of a laterally movable member interacting with plant stalks in an elongate gap of a row harvesting unit is sensed and can be mapped for providing a stalk diameter map of a field that can be used for agronomic purposes, like determining a location-specific amount of fertilizer. The derived per-plant diameters provide valuable data for agronomic purposes or data analytics of equipment performance for problem resolution and new product design and value to seed or chemical companies for problem resolution and future product development.

Figure 1:
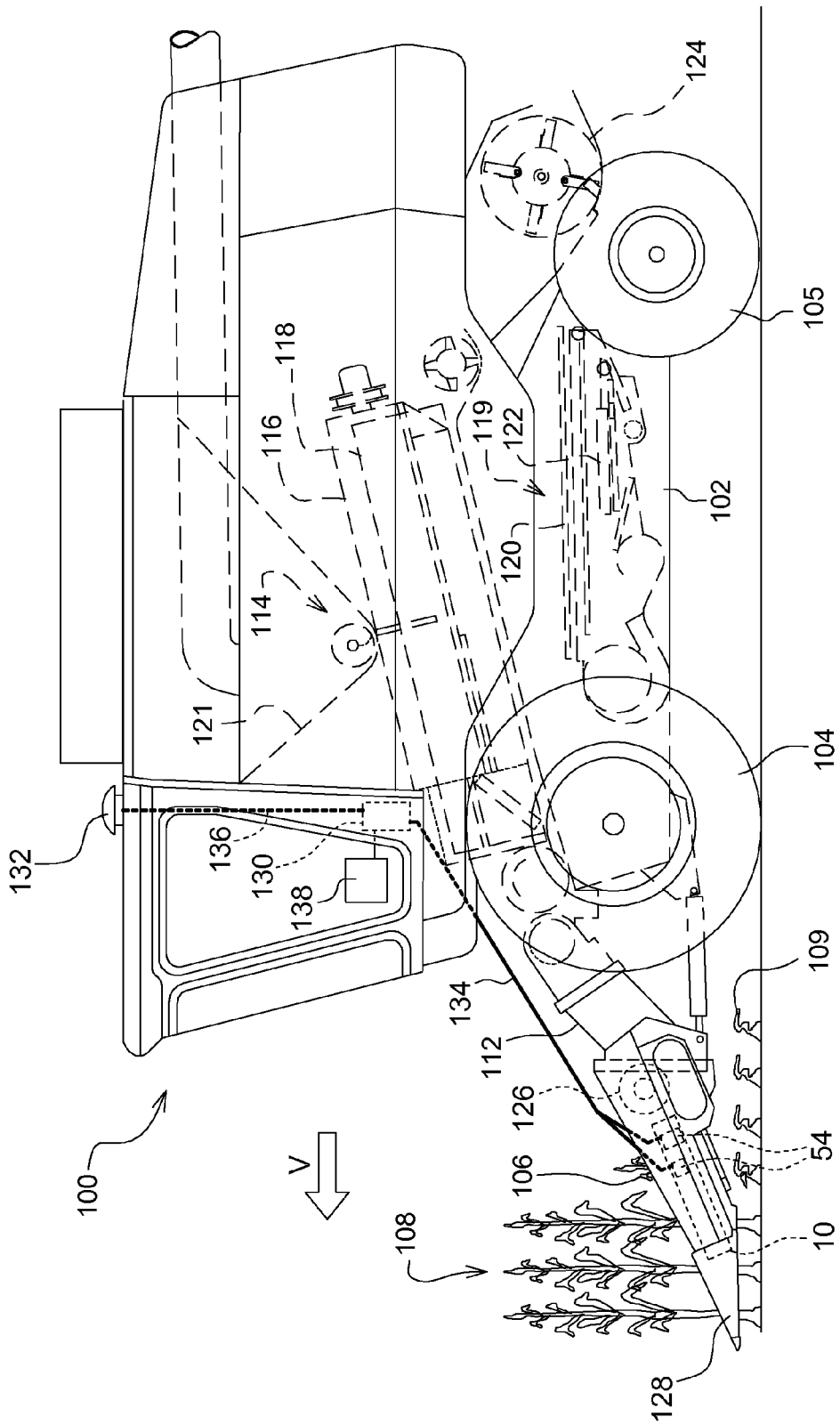
FIG. 1 shows a schematic side view of an example agricultural machine with a header comprising row units.

FIG. 1 shows a schematic side view of an example agricultural machine, for example a combine 100, with a header 106 comprising one or more row units, for example row harvesting units 10. Although aspects of the inventions have been described herein with reference to a combine, teachings of the invention are relevant also to other agricultural machines, for example harvesters, such as sugarcane harvesters, forage harvesters, etc.

Reference is made to FIG. 1, showing a combine 100 with a header 106. Header 106 is shown mounted on a feederhouse 112 at the front end of a chassis 102 of the combine 100. In an example embodiment, header 106 is used to gather stalk plants 108 like corn or sunflowers growing in a field and strip the fruit, like ears, from the plant stalks. The plant stalks 109, now stripped of their fruit, are left on the ground. The fruits are carried through the header 106 and rearward through the feederhouse 112 which supports the header 106 on the combine 100. Once the fruits pass through the feederhouse 112 they go into a threshing system 114 which includes a rotor 116 disposed inside a concave 118. The rotor 116 rotates within the concave 118 thereby threshing and separating corn kernels from the corn cobs and corn husks. The corn kernels fall downward into an oscillating cleaning shoe 119 which passes them through a sieve 120 and chaffer 122, whereupon they are collected and conveyed upward into a grain tank 121. Corn residue including corn cobs and corn husks pass rearward through the rotor and concave arrangement and are chopped in a chopper 124. The chassis 102 is supported on driven front wheels 104 and steerable rear wheels 105.

The header 106 comprises a number of row harvesting units 10, arranged side by side. The fruits harvested by the row harvesting units 10 are fed into the feederhouse 112 by a cross auger 126.

Figure 2:
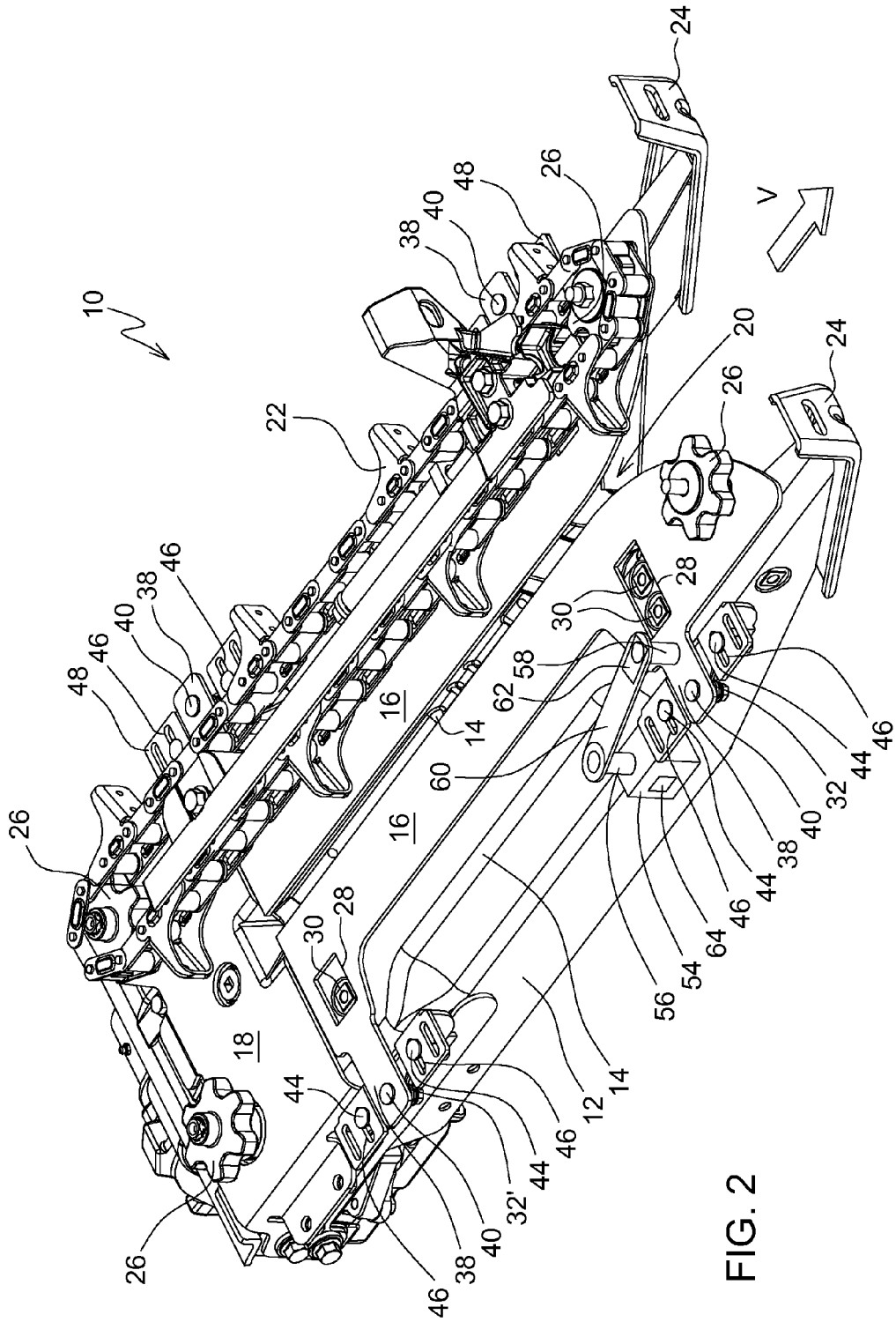
FIG. 2 shows a perspective lateral top view of an example row unit of the header of FIG. 1 with a laterally movable, spring-biased stripper plate and a sensor for sensing stalk diameters.

In FIG. 2, an example row unit, for example row harvesting unit 10 of the header 106 is shown. The row harvesting unit 10 comprises a frame 12 supporting two parallel stalk rolls 14 and stripper plates 16 above the stalk rolls 14. The stalk rolls 14 are supported at their rear end and driven in a rotary motion by a transmission 18 located at the rear end of the row harvesting unit 10. The rotation axes of the stalk rolls 14 are generally at a shallow angle relative to horizontal and extend in the forward and downward direction when the combine 100 is driving the corn head with the row unit 10 over a field. However, other embodiments are possible in which the stalk rolls 14 are oriented transversely to the forward direction.

The stripper plates 16 are located above the stalk rolls 14 and form a stripper gap 20 between them. The longitudinal extension of the stripper gap 20 is parallel to the axes of the stalk rolls 14. During operation, corn plants or other stalk plants with fruit, like sunflowers, are introduced into the stripper gap 20 and their stalks are pulled down between the two stalk rolls 14. The ears or fruits are thicker than the stalks and stripped off by the stripper plates 16. A respective chain conveyor 22, also driven by the transmission 18, is located above each stripper plate 16 and feeds the separated ears or fruits towards the rear, from where they are fed by the cross auger 126 of the corn head 106 into the feederhouse 112 of the combine 100. A second chain conveyor is located above the stripper plate 16 shown on the left hand side in FIG. 1; the sprockets 26 of this second chain conveyor are shown. In the preceding and following, all direction references, like forward and lateral, are given with respect to the forward direction of the row unit 10 which extends along the arrow marked "V".

The row harvesting unit 10 further comprises divider tips 128 mounted to brackets 24 at the forward end of the row harvesting unit 10.

Both stripper plates 16 are not fixed to the frame 12, but allowed to shift in the lateral direction, for example, transversely to the longitudinal extension of the stripper gap 20 and at a shallow angle relative to horizontal. In an example embodiment, this is achieved by rectangular slots 28 at the front and rear end of the stripper plates 16 extending transversely to the longitudinal extension of the stripper gap. One or two support rollers 30 supported on the frame 12 extend into the rectangular slots 28 in order to support the stripper plate 16 and restrict its shifting range. Additional clamps can encase the stripper plate 16 between them and the frame 12 for added stability.

Figure 3:
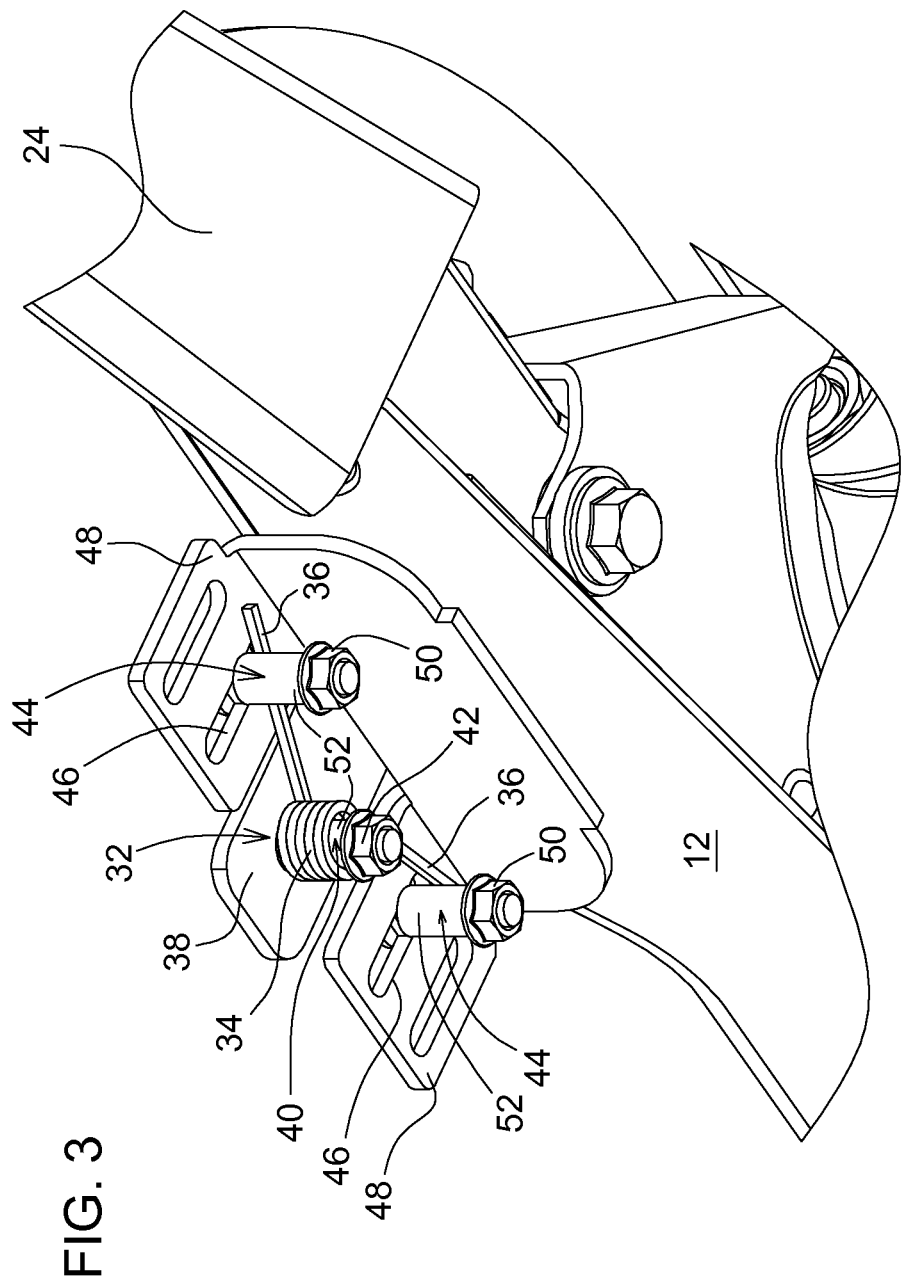
FIG. 3 shows a perspective bottom view of the spring mechanism for biasing the stripper plate.

In the illustrated embodiment, respective springs 32 serve to bias respective stripper plates 16 laterally towards the center of the elongate gap 20. As shown in more detail in FIG. 3, the springs 32 have a central helical part 34 and two outer end parts 36, which are shown as being straight, but could also be slightly curved. A first spring 32 is provided at a first (forward) end of the stripper plate 16 and a second spring 32' at a second (rear) end of the stripper plate 16. A mounting link 38 formed integrally with the stripper plate 16 extends, in the plane of the stripper plate 16, laterally from the stripper plate 16 beyond the lateral end of the frame 12. Mounting link supports a pin 40 which is shown as a bolt extending through a corresponding bore or hole in the mounting link 38 and is fixed by a nut 42. In FIG. 3, the central helical part 34 of the spring 32 is shown wound around the pin 40.

Both outer ends 36 of the spring 32 abut a respective bolt 44 that extends through a laterally extending slot 46 in a plate 48 which is fixed, e.g. welded or bolted, to the frame 12. The bolts 44 are fixed in the slot 46 at a selectable position by means of nuts 50 or other fastening mechanism. Cylindrical bushings 52 on the bolts 44 and on pin 40 protect the spring 32 from wear.

As shown, the pin 40 is located, viewed in the longitudinal direction of the elongate gap 20, between the bolts 44. By loosening the nuts 50 from the bolts 44, the latter can be moved to any position along the slot 46 and fixed again. In an example implementation, both bolts 44 on both sides of the pin 40 are moved to the same or similar lateral positions in order to achieve a symmetric bias of the pin 40 and thus of the mounting link 38 and the stripper plate 16 and avoid binding, in particular of the slots 28 with the support rollers 30. The spring 32 thus adjustably biases the stripper plate 16 in a manner without a significant risk of binding.

In another possible embodiment, the bolts 44 are replaced by fingers extending vertically from the plate 48. Vertical slots remain between the fingers, allowing for the introduction of the end parts 36 of the spring 32 in one of a number of selectable positions in which they abut a respective one of the fingers in order to adjust the bias force.

According to an example embodiment, the row harvesting unit 10 comprises a sensor 54 adapted to generate a signal representative of the position of the stripper plate 16 in its lateral shifting direction. In an example embodiment, the sensor 54 comprises a housing from which a rotatable shaft 56 extends vertically. The shaft 56 is coupled with an arm 60 having an elongate hole 62 at its second end spaced from the shaft 56. A pin 58 is connected to the stripper plate 16 and extending vertically therefrom extends through the elongate hole 62. The housing of the sensor 54 is on its end mounted on the rear edge of the plate 48. When the first stripper plate 16 (shown on the left side in FIG. 2) moves laterally, due to a plant stalk entering the elongate gap 20, the pin 58 will also move and hence the arm 60 will rotate together with the shaft 54 around the axis of the latter.

The sensor 54 contains a member for sensing the rotational angle of the shaft 54, for example a rotational potentiometer or a light barrier encoder, and thus provides at its output 64 a signal which is representative of the lateral position of the stripper plate 16. A second sensor 54 (not visible in FIG. 2) is connected to the second stripper plate 16, shown on the right side in FIG. 2. Both sensors 54 are connected by a line 134 to a processing unit 130, which is also connected to a localization or geoposition system 132. The system may receive signals from a terrestrial beacon and/or satellite based geoposition determining system, like GPS or Glonass, by a line 136, or from local optical sensors for determining the respective position of the combine 100. Localization and geoposition systems are well known in the art.

Processing unit 130 comprises one or more processing units configured to follow instructions provided in a non-transitory computer-readable medium to receive signals from sensors 54 and to derive, determine or estimate a stalk diameter value based upon such signals. In one implementation, the stalk diameter value is an estimated or determined diameter of an individual stalk based upon received signals corresponding to contact with the individual stalk. In such an implementation, processing unit 130 distinguishes between individual stalks by determining when contact with an individual stalk begins and when contact with an individual stalk ends. Processing unit 130 determines or estimates the stalk diameter for each stalk using only those signals resulting from contact with the individual stalk.

In another implementation, the determined stalk diameter value is a statistical value for the stalk diameter of an individual stalk based upon received signals corresponding to contact with multiple stalks. In such an implementation, processing unit 130 distinguishes between individual stalks. Processing unit 130 counts a number of stalks being sensed or that have been sensed. Processing unit 130 utilize the determined number of stalks that have been sensed to generate, output in store data identifying statistics regarding the population or percent of the population of plants having different ranges of stalk diameters.

In one implementation, processing unit 130 additionally or alternatively determines a stalk diameter value which is a statistical value based upon signals received during the sensing of a group of multiple stalks. In such an implementation, processing unit 130 receive signals over time as multiple stalks are being contacted. In one implementation, processing unit 130 utilizes signals produced by the sensing of the multiple stalks to determine or an average or median stalk diameter value for a group of stalks based upon signals received during contact with group of stalks over time. In one implementation, such statistical determinations for groups of stalks are based on a row by row basis, wherein statistical determination is made at periodic intervals such as after machine 100 has traversed a predetermined distance, after a predetermined period of time has elapsed, and/or after a predefined number of plants have been sensed. For example, in one implementation, processing unit 130 automatically determines a statistical value for stalk diameter for each 5 yards traversed by machine 100, after each 30 second time interval during harvesting or after each completion of sensing of a set of 10 plants in a row. By determining a statistical value for an individual stalk diameter using signals resulting from contact with multiple stalks, computational burden is reduced.

In another implementation, such statistical determinations for groups of stalks are based on signals received as stalks across a swath of a header are being sensed. For example, processing unit 130 may determine an average or median stalk diameter value based upon signals received as the stalk of plants across each of the row units or a selected set of row units are being sensed. In particular, in one implementation, processing unit 130 determines an average or median stalk diameter value utilizing signals received from each of eight row units across the swath of the header during a particular periodic interval, whether the periodic interval be the sensing of an individual plant in each of the row units, the sensing of a predetermined group of plants in each row unit, the traversal of a predetermined distance by machine 100 or the lapse of a predetermined amount of time.

For purposes of this application, in an example embodiment, the term "processing unit" means a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, processing unit 130 may be embodied as part of one or more application-specific integrated circuits (ASICs). Unless otherwise specifically noted, the controller is not limited to any specific combination of hardware circuitry and software, nor to any particular source for the instructions executed by the processing unit.

During the harvest operation, the processing unit 130 receives signals from at least one of the two sensors 54 of a row harvesting unit 10 and derives therefrom the diameter of stalks harvested in the row harvesting unit 10. These diameters are stored with the respective position of the plant, the position derived from the signals from the antenna 132, in a memory 138 connected to the processing unit 130, in order to generate a map of the stalk diameters. In an example embodiment, all row harvesting units 10 of the header 106 are provided with sensors 54, such that the stalk diameters of all rows harvested by the header 106 are evaluated by the processing unit 130 and stored in the memory in a geo-referenced manner. Also the number of harvested plants is evaluated from the signals of the sensors 54 and stored in memory. The memory 138 can be a removable memory card and thus be removed from the combine 100 after harvest for evaluating the data. In another embodiment, the content of memory 138 can be submitted in a wireless manner, for example by a GSM, Bluetooth or WIFI connection, to another computer for further evaluation.

Figure 4:
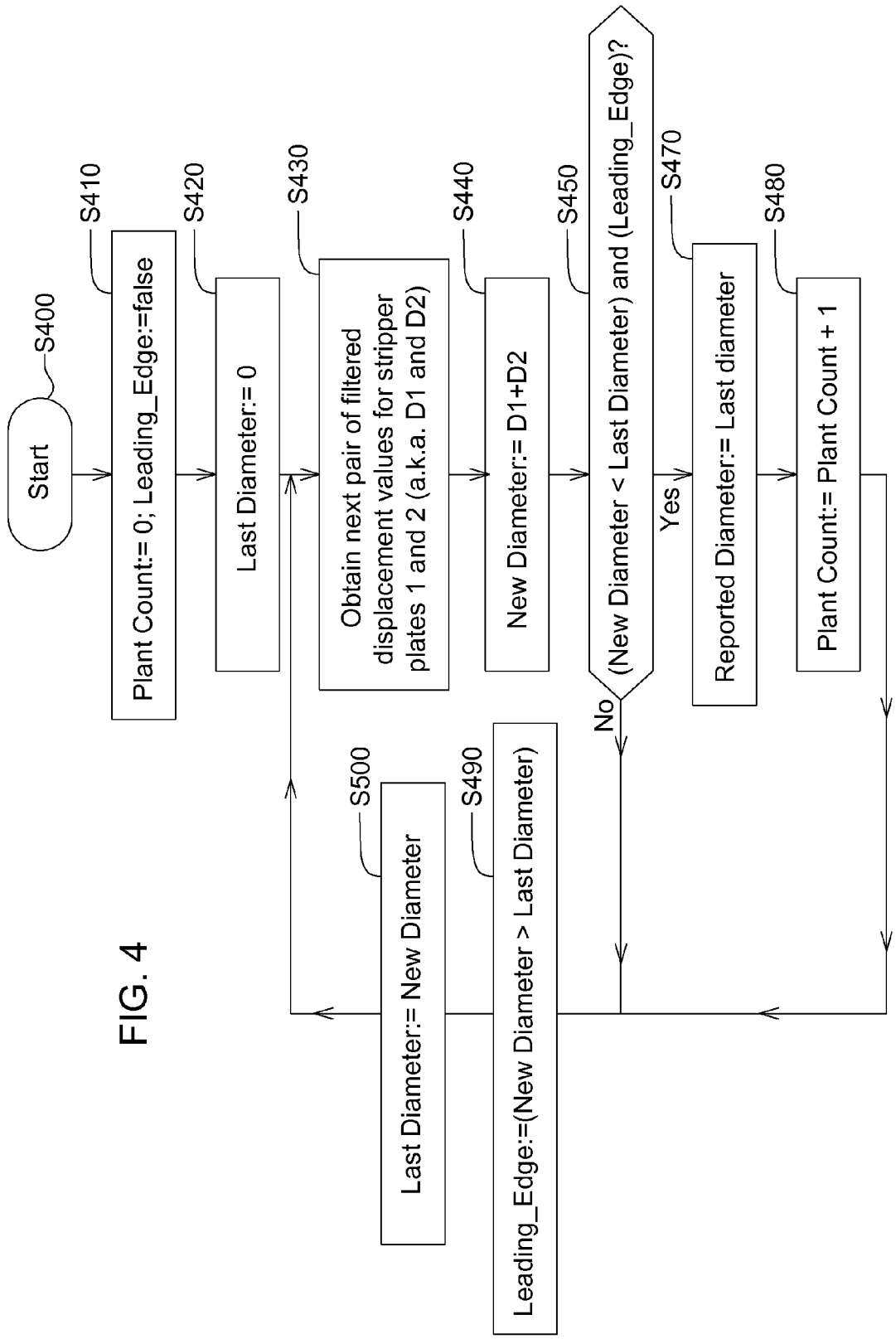
FIG. 4 shows an example flow diagram according to which a processing unit for sensing stalk diameters operates.

FIG. 4 represents schematically an example operation of the processing unit 130 during the harvest operation. After start in S400, including initialization, step S410 is executed in which a register for counting the number of plants is set to zero, and a flag named Leading_Edge indicating that the leading part of a stalk 108a, 108b, 108c is processed is set to false. Then, in step 420 a register for the last stalk diameter is also set to zero.

In the next step S430, an actual pair of displacement values for the two stripper plates 18 assigned to an elongate gap 20 is received from the sensors 54. In another embodiment, only a single one of the stripper plates may be movable, and at step S430, instead of a pair of actual displacement values for the two stripper plates 18, the actual displacement value for that stripper plate is received from the associated sensor 54.

These values represent the offset of the respective stripper plate 54 from their rest position in which they abut each other. The values are added in order to derive the actual stalk diameter of a stalk entering the elongate gap 20. Thus, when a stalk 108a enters the frontal, tapered part of the elongate gap 20, as represented in FIG. 5, the stripper plates 18 will begin to separate and thus the signals from the sensors 54 will increase, as shown in FIG. 6. The signals from the sensors 54 can be filtered in the sensor 54 and/or the processing unit 130 for noise reduction. Typically an analog sensor signal is sampled and converted into a digital value at periodic intervals. In other example implementations, the analog signal may be filtered with analog circuits before being sampled and converted to a digital value. Common filtering methods include without limitation averaging, median, low pass, and notch.

In the following step S440, a register representing the new diameter is set to the actual stalk diameter which was determined in step 430.

In the next step S450, it is checked whether the new diameter is smaller than the last diameter and at the same time whether the Leading_Edge flag is true. If the result is no, step S490 is executed in which the Leading_Edge flag is set to true if the new diameter is larger than the last diameter and otherwise to false. S490 is followed by S500 in which the last diameter is set to the new diameter, followed again by step S430.

However, if the result in step S450 is yes, step S470 follows. In step S470 a register representing the determined diameter of a stalk plant is set to the respective last diameter. This determined diameter is stored in memory 138, preferably together with the respective position, derived from the signals from antenna 132. In the next step S480, a plant counter may be increased by 1, followed by step S490.

The processing unit 130 thus stores the respective peaks of the signals for the stalk diameters. The signals for the stalk diameters follow the curve of FIG. 6, since a stalk 108*a* (cf. FIG. 5) entering the elongate gap 20 pushes the stripper plates 18 apart. When the stalk 108*a* is pulled down by the stalk rolls 14, the parts of the stalk 108 interacting with the stripper plates 18 get thinner, as represented in FIG. 5 by the stalks 108*b* and 108*c*, thus also the signal from the sensors 54 decreases with time. The next incoming stalk then increases the signal again. The algorithm of FIG. 4 finds the local maximal displacement of the stripper plates 18, assigns it to a stalk and stores the respective diameter in the memory 138.

In an example embodiment, if a number of stalks are within the elongate gap 20 at the same time, the signal from the sensors 54 depends only on the thickest stalk, which is according to FIG. 5 normally the foremost one (108*a* in FIG. 5). Thus, the rear stalks 108*b* and 108*c* still present in the elongate gap 20 do only occasionally negatively influence the sensing result.

Having described at least one or more embodiments, it will become apparent that various modifications can be made without departing from the scope of the invention as defined in the accompanying claims.

For example, the sensors 54 can interact with the rear mounting links 38 of FIG. 2. The signals form the sensors 54 may be communicated via a wired (as shown), wireless, optical, or other suitable transmission means. Power may be supplied to the sensors 54 using wires, but may also be harvested and converted to electricity locally, such as piezoelectricity and induction, thus taking advantage of mechanical motion in the header 106. The sensor 54 can thus be powered by an energy harvesting system comprising magnets mounted on the rotating stalk rolls 14, a stationary coil in which a current is induced by the fields of rotating magnets, and a power conditioning circuit. Such an energy harvesting system can also be powered by the mounting links 38. One of the described power harvesting systems can also power the processing unit 130, in particular if it is provided on the header 106.

In another embodiment, in which the stripper plates are actively adjusted by an actuator, the sensor 54 can sense the displacement of the actuator piston to calculate the separation value along with a known transmission ratio between the actuator and the stripper plates. Because of the piston motion, the piston itself could be an energy harvesting device. For example, the piston could be a magnet which induces a current in the coil spring. Elimination of wires for power and communication may reduce cost and improve reliability.

The sensor 54 can incorporate a linear potentiometer, for example coupled to one of the mounting links 38, or a rack and pinion drive coupling the linear stripper plate motion to a rotational potentiometer, or a differential transformer or a Hall Effect sensor.

The elongate gap 20 may not be of substantially uniform width over its active length, different from the embodiment of FIG. 5. In order to avoid errors caused by relatively thick plants between thinner plants, the elongate gap 20 can have a taper over its length to enable the stripper plates 16 to better follow the taper of stalks 108*a*, 108*b*, 108*c* as their diameter reduces during the stalk travel along the elongate gap 20, as shown in a second embodiment illustrated in FIG. 7. The taper (for example, slope of the stripper plate edges with respect to the forward direction V) and/or speed of the stalk rolls 14 could be adjustable in order to adjust them to the conicity of the stalks. The embodiment according to FIG. 7 thus senses an average of the diameters of a plurality of stalks, for example stalks 108*a*, 108*b*, 108*c*, in the elongate gap 20. This average value can also be interesting for agronomic purposes. In this embodiment, it is difficult to identify single stalks from the signals of the sensors 54, such that the sensor values can be mapped continuously during the harvest operation.

In another embodiment illustrated in FIG. 8, the stripper plates 16 could be shaped with noses 66 at the inlet end forming a narrower channel at the front to give measurement priority to the inlet end of the elongate gap 20,.

Figures 9, 10:
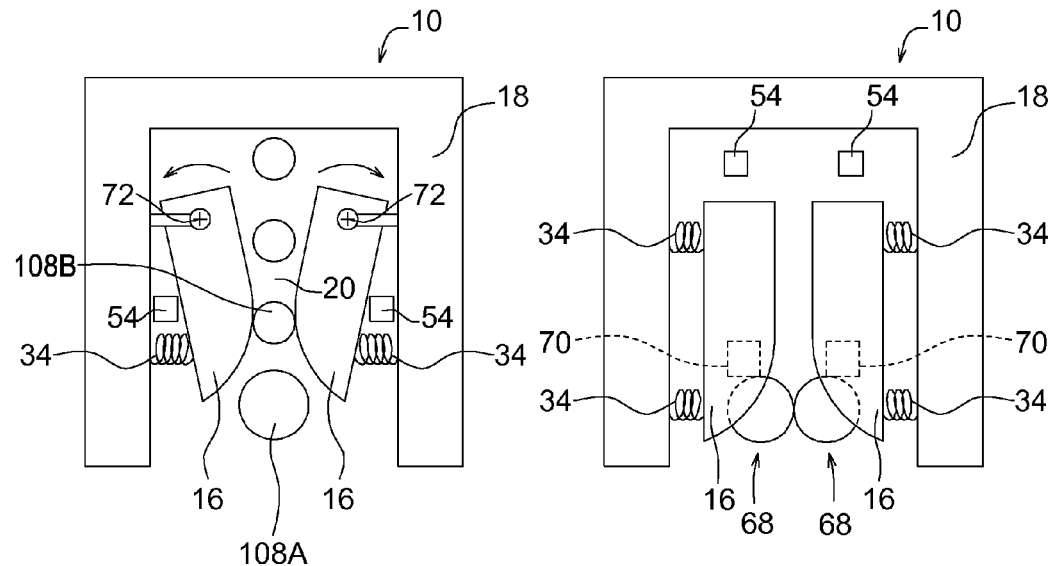
FIG. 9 is a schematic representation of a fourth embodiment of a row unit.
FIG. 10 is a schematic representation of a fifth embodiment of a row unit.

In another embodiment, as indicated in FIG. 9, the rear ends of the stripper plates 16 are rotatably mounted on the frame 18 around vertical axes 72. The front ends of the stripper plates 16 are biased towards each other by the springs 34. This also gives measurement priority to the inlet end of the elongate gap 20.

Figure 11:
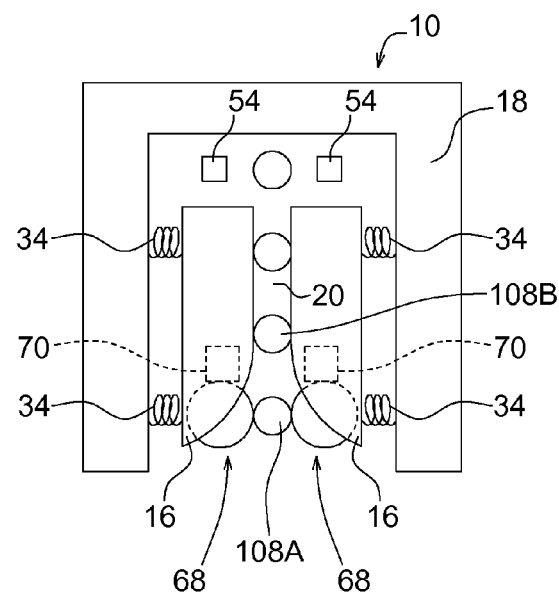
FIG. 11 shows the row unit of FIG. 10 with a stalk entering.

Another embodiment of a row unit, for example, row harvesting unit 10 is shown in FIGS. 10 and 11. Mechanical feeler elements 68 are mounted at the inlet end of the stripper plates 16, which are movable (for example, shiftable or rotatable around a vertical axis) against the force of a spring (not shown) to move in the lateral direction, transversely to the longitudinal extension of the elongate gap 20. A feeler element sensor 70 is assigned to each feeler element 68 and senses the lateral position of the respective feeler element 68. A stalk entering the elongate gap 20 thus shifts or turns the feeler elements 68 in the lateral direction, as shown in FIG. 11. The amount of this movement is sensed by the feeler element sensor 70 and transmitted to the processing unit 130, which processes the signals from the feeler element sensors 70 as indicated in FIG. 4 and described above. In this embodiment, the springs 34 and sensors 54 could be omitted, for example, the stripper plates 16 can be fixed to the frame 18, normally in an adjustable manner. However, if springs 34 and sensors 54 are provided, the processing unit also processes the signals from the sensors 54 to calculate the true space between the feeler elements 68.

Finally, the elongate gap 20 can also be curved in at least one of its transverse direction and longitudinal direction, and the stripper plates 16 can be resiliently mounted to move in a vertical direction, while the sensors 54 sense the displacement of the stripper plates.

While the above describes example embodiments of the invention, these descriptions should not be viewed in a limiting sense. Rather, there are several variations and modifications which may be made without departing from the scope of the present invention as defined in the appended claims.

What is claimed is:

1. A system for sensing the diameter of stalks of plants, the system comprising:
    a row harvesting unit with a frame defining an elongate gap along which stalks of plants move during a harvesting operation;
    a first sensor coupled to a laterally movable member arranged to contact a stalk of a plant located within the elongate gap and adapted to generate a signal representative of the position of the laterally movable member; and
    a processing unit adapted to derive a stalk diameter value representative of a diameter of the stalk from the signal of the first sensor and to store the stalk diameter value in a memory.

2. The system of claim 1, wherein the row harvesting unit comprises:
    at least one stalk roll supported on the frame to be rotatable around its axis and arranged to pull down a plant stalk; and
    a first stripper plate and a second stripper plate, the stripper plates supported on the frame and forming the elongate gap between the stripper plates above the stalk roll, the elongate gap having a longitudinal extension essentially parallel to the axis of the stalk roll.

3. The system of claim 2, wherein the first stripper plate is supported to be movable in a direction extending transversely to the longitudinal extension of the elongate gap against a biasing force biasing the first stripper plate towards the second stripper plate and the first sensor coupled to the first stripper plate and adapted to generate a signal representative of the position of the first stripper plate.

4. The system of claim 3, wherein the second stripper plate is supported to be movable in a direction extending transversely to the longitudinal extension of the elongate gap against a biasing force biasing the second stripper plate towards the first stripper plate, a second sensor coupled to the second stripper plate and adapted to generate a signal representative of the position of the second stripper plate, and the processing unit is adapted to derive the stalk diameter values representative of the stalk diameter of plants located within the elongate gap from signals of the first sensor and of the second sensor.

5. The system of claim 4, wherein the processing unit is adapted to assign a local maximum of added signals from the first sensor and the second sensor to a stalk.

6. The system of claim 1, wherein a feeler element is laterally movably mounted at an inlet end of the elongate gap and the first sensor senses the position of the feeler element.

7. The system of claim 1, wherein the processing unit is connected to a position determination system and adapted to store the respective position of the system together with the stalk diameter value.

8. The system of claim 1, wherein the elongate gap has a generally uniform width over its length.

9. The system of claim 1, wherein the elongate gap has a decreasing width over its length.

10. The system of claim 1, wherein the elongate gap is provided with noses at an inlet end forming a narrower channel at the front.

11. The system of claim 2, wherein the stripper plates are supported around vertical axes at their rear ends and biased by springs at their front ends.

12. A harvesting machine comprising a system according to claim 1.

13. A method comprising:
    receiving an electronic signal from a sensor associated with a laterally movable stalk contacting member, the electronic signal indicating a position of the laterally movable stalk contacting member; and
    determining a stalk diameter value based upon the electronic signal.

14. The method of claim 13, wherein the laterally movable stalk contacting member comprises a stripper plate, the electronic signal indicating a position of the stripper plate.

15. The method of claim 13 further comprising identifying initiation of contact with an individual stalk by the laterally movable stalk contacting member and termination of contact with the individual stalk by the laterally movable stalk contacting member based upon the electronic signal.

16. The method of claim 13 further comprising determining a number of stalks contacted over time by the laterally movable stalk contacting member.

17. The method of claim 13, wherein the determined stalk diameter value is a statistical value based upon the electronic signal received as a result of the laterally movable stalk contacting member contacting multiple stalks.

18. The method of claim 13, wherein the laterally movable stalk contacting member comprises a pivotably supported stripper plate, the electronic signal indicating an extent of pivoting by the stripper plate.

19. The method of claim 13, wherein the laterally movable stalk contacting member comprises a first stripper plate and wherein the method further comprises receiving a second electronic signal from a second sensor associated with a second stripper plate opposite the first stripper plate, the second electronic signal indicating a position of the second stripper plate, wherein the stalk diameter value is determined based upon the electronic signal and the second electronic signal.

20. The method of claim 13 further comprising resiliently biasing the laterally movable stalk contacting member towards an elongate gap which is to receive a stalk for which the stalk diameter is determined.

21. The method of claim 13, wherein the laterally movable stalk member comprises a feeler element at an inlet end of an elongate gap that is to receive the stalk.

22. The method of claim 13 further comprising storing the determined stalk diameter value.

23. The method of claim 13 further comprising:
    receiving geo-position signals;
    generating a map of stalk diameter values comprising the determined stalk diameter value based upon the geo-position signals.

24. The method of claim 13 further comprising generating the electronic signal by sensing the position of the laterally movable member.

25. The method of claim 13 further comprising receiving a second electronic signal from a second sensor associated with a second laterally movable stalk contacting member opposite the laterally movable stalk contacting member, the second electronic signal indicating a position of the second laterally movable stalk contacting member, wherein the stalk diameter value is determined based upon the electronic signal and the second electronic signal.

26. The method of claim 13 further comprising:
generating electrical power from mechanical motion in a header supporting the laterally movable stalk contacting member; and
powering the sensor with the generated electrical power.

27. An apparatus comprising:
a non-transitory computer-readable medium providing computer-readable programming to direct a processor to:
receive an electronic signal from a sensor associated with a laterally movable stalk contacting member, the electronic signal indicating a position of the laterally movable stalk contacting member; and
determine a stalk diameter value based upon the signal.

28. The apparatus of claim 27, wherein the computer-readable programming is configured to direct the processor to determine initiation of contact with an individual stalk by the laterally movable stalk contacting member and determine termination of contact with the individual stalk by the laterally movable stalk contacting member based upon the electronic signal.

29. The apparatus of claim 27, wherein the computer-readable programming is configured to determine a number of stalks contacted over time by the laterally movable stalk contacting member.

30. The apparatus of claim 27, wherein the stalk diameter value is a statistical value based upon the electronic signal received as a result of the laterally movable stalk contacting member contacting multiple stalks.

* * * * *